(12) United States Patent
Kawanishi et al.

(10) Patent No.: US 11,352,985 B2
(45) Date of Patent: Jun. 7, 2022

(54) EVAPORATED FUEL TREATMENT DEVICE AND FLUID TREATMENT DEVICE

(71) Applicant: HONDA MOTOR CO., LTD., Tokyo (JP)

(72) Inventors: Hiroshi Kawanishi, Saitama (JP); Naoaki Ishii, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/180,875

(22) Filed: Feb. 22, 2021

(65) Prior Publication Data
US 2021/0262418 A1 Aug. 26, 2021

(30) Foreign Application Priority Data
Feb. 26, 2020 (JP) .............................. JP2020-030625

(51) Int. Cl.
*F02M 25/08* (2006.01)
(52) U.S. Cl.
CPC ...... *F02M 25/089* (2013.01); *F02M 25/0872* (2013.01)
(58) Field of Classification Search
CPC .................. F02M 25/089; F02M 25/0872
See application file for complete search history.

(56) References Cited

U.S. PATENT DOCUMENTS

| 10,557,403 | B2 * | 2/2020 | Sager ................... F02D 41/0032 |
| 2018/0043319 | A1 * | 2/2018 | Schneider ......... B01F 15/00935 |
| 2019/0128218 | A1 * | 5/2019 | Kawanishi ................ F04F 5/20 |

FOREIGN PATENT DOCUMENTS

JP 2019085893 A 6/2019

* cited by examiner

*Primary Examiner* — Xiao En Mo
(74) *Attorney, Agent, or Firm* — CKC & Partners Co., LLC

(57) ABSTRACT

Provided is an evaporated fuel treatment device including a mounting part 90 provided in an intake pipe, and a purge pump 5 including a discharge part 71, a first introduction tube 61, and a second introduction tube 66. A pump body 6 of the purge pump 5 includes a pump tube 7 formed with a pump flow path 70 that extends along an axis O and that guides, to the discharge part 71, fluid to be introduced from the introduction tube 61. A reduced part 73 with a diameter decreasing toward downstream is formed in the flow path 70 on a side downstream of the introduction tube 61, and a connection flow path 78 that connects the introduction tube 66 and the flow path 70 is formed, and in a state where the pump body 6 is removed from the mounting part 90, the flow path 78 communicates with outside.

4 Claims, 10 Drawing Sheets

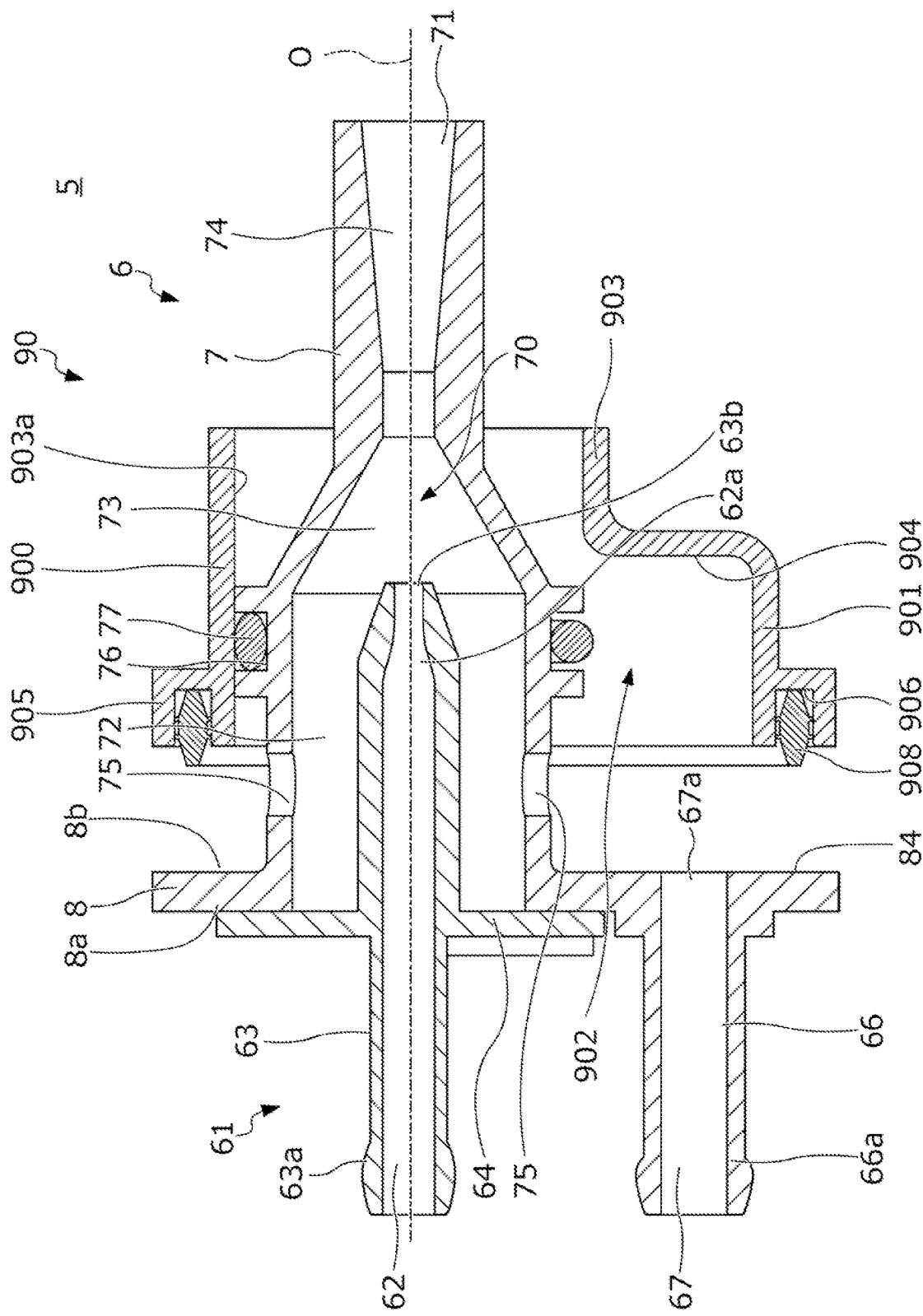

EVAPORATED FUEL TREATMENT DEVICE AND FLUID TREATMENT DEVICE

This application is based on and claims the benefit of priority from Japanese Patent Application No. 2020-030625, filed on 26 Feb. 2020, the content of which is incorporated herein by reference.

BACKGROUND OF THE INVENTION

Field of the Invention

The present invention relates to an evaporated fuel treatment device and a fluid treatment device.

Related Art

In a vehicle comprising a fuel tank, an evaporated fuel treatment device that treats evaporated fuel generated in this fuel tank is mounted. In a conventional evaporated fuel treatment device, the evaporated fuel generated in the fuel tank is adsorbed on activated carbon in a canister, and the evaporated fuel adsorbed on the activated carbon is purged with fresh air by use of negative pressure generated in an intake pipe, to be introduced into the intake pipe and combusted in an engine. In a case where the intake pipe is provided with a supercharger compressor, however, during supercharging, the intake pipe has positive pressure on a side downstream of this compressor, and hence, the evaporated fuel adsorbed on activated carbon cannot be purged by using the negative pressure.

In Patent Document 1, a jet pump for use in an internal combustion engine comprising a supercharger is described. In the jet pump described in Patent Document 1, intake air introduced from a downstream side of the supercharger with a high pressure during supercharging flows along a pump flow path formed with a Venturi toward an upstream side of the supercharger with a low pressure during the supercharging. Also, evaporated fuel adsorbed on activated carbon is purged by using the negative pressure generated when the intake air flows along the Venturi.

Furthermore, if the jet pump in which such a Venturi effect as described above is used is disconnected from an intake pipe, there is concern that the evaporated fuel attracted by the negative pressure flows out to the atmosphere. To solve the problem, in the jet pump described in Patent Document 1, a negative pressure generation function is actively lost to thereby prevent the evaporated fuel from flowing out to the atmosphere, if something goes wrong with the jet pump.

More specifically, in the invention disclosed in Patent Document 1, the jet pump is formed as an assembly constituted of two or more members of an upstream part and a downstream part divided via the Venturi. That is, in the invention disclosed in Patent Document 1, if a bolt coupling the jet pump and the intake pipe is loosened, the upstream part and the downstream part are separated to destroy the Venturi, thereby losing the negative pressure generation function.

Patent Document 1: Japanese Unexamined Patent Application, Publication No. 2019-85893

SUMMARY OF THE INVENTION

In a case where a jet pump is formed as an assembly as in the invention disclosed in Patent Document 1, for inspecting quality of an original negative pressure generation function of this jet pump, it is necessary to assemble an upstream part and a downstream part and further to mount this assembly to an intake pipe. That is, the jet pump described in Patent Document 1 cannot be inspected for the quality of the negative pressure generation function by itself. Furthermore, for performing the inspection, it is necessary to assemble the jet pump, which takes time and labor.

An object of the present invention is to provide an evaporated fuel treatment device and a fluid treatment device, in which quality of a negative pressure generation function can be inspected in a short time and with less labor.

(1) An evaporated fuel treatment device according to the present invention (e.g., an after-mentioned evaporated fuel treatment device 2) comprises a pump mounting part (e.g., an after-mentioned pump mounting part 90) provided in an intake passage (e.g., an after-mentioned intake pipe 4) of an internal combustion engine (e.g., an after-mentioned engine 1) on a side upstream of a supercharger (e.g., an after-mentioned supercharger 93); a purge pump (e.g., an after-mentioned purge pump 5) including a discharge part (e.g., an after-mentioned discharge part 71), a first introduction part (e.g., an after-mentioned first introduction tube 61), and a second introduction part (e.g., an after-mentioned second introduction tube 66); a bypass passage (e.g., an after-mentioned bypass pipe 35) that communicates between the intake passage on a side downstream of the supercharger and the first introduction part; and a purge passage (e.g., an after-mentioned first purge pipe 33 and second purge pipe 36) that communicates between a canister (e.g., an after-mentioned canister 32) containing an adsorbent material that adsorbs evaporated fuel and the second introduction part, wherein in a state where the purge pump is mounted to the pump mounting part, fluid introduced from the first and second introduction parts is discharged through the discharge part into the intake passage. The purge pump is a cylindrical pump formed with a pump flow path (e.g., an after-mentioned pump flow path 70) that extends along a flow direction (e.g., an after-mentioned axis O) of the fluid to be introduced from the first introduction part and that guides, to the discharge part, the fluid to be introduced from the first introduction part, a reduced part (e.g., an after-mentioned reduced part 73) with a diameter decreasing toward downstream is formed in the pump flow path on the side downstream of the first introduction part along the flow direction, in a state where the purge pump is mounted to the pump mounting part, a connection flow path (e.g., an after-mentioned connection flow path 78) that connects the second introduction part and the pump flow path is formed, and in a state where the purge pump is removed from the pump mounting part, the connection flow path communicates with outside.

(2) In this case, it is preferable that a through hole (e.g., an after-mentioned through hole 75) that communicates with the pump flow path is formed in the purge pump closer to a side of the first introduction part than the reduced part, the second introduction part is a tubular part in which a conduit line (e.g., an after-mentioned second conduit line 67) is formed, and in the state where the purge pump is mounted to the pump mounting part, the connection flow path is defined and formed as a space that connects the conduit line and the pump flow path via the through hole.

(3) In this case, it is preferable that the purge pump comprises a cylindrical part (e.g., an after-mentioned pump tube 7) having an interior formed with the pump flow path and an outer periphery formed with the through hole, and a flange part (e.g., an after-mentioned flange part 8) provided in the cylindrical part closer to a side of the first introduction part than the through hole and extending in an orientation that is orthogonal to the pump flow path, the second introduction part is provided on a surface (e.g., an after-mentioned surface 8a) of the flange part on the first introduction part side, the conduit line extends through the flange part, and in the state where the purge pump is mounted to the pump mounting part, the pump mounting part is in close contact with an annular seal surface (e.g., an after-mentioned seal surface 84) that is a surface (e.g., an after-mentioned back surface 8b) of the flange part on a side of the discharge part and that surrounds the cylindrical part and the conduit line.

(4) A fluid treatment device (e.g., an after-mentioned evaporated fuel treatment device 2) according to the present invention comprises a main body (e.g., an after-mentioned pump body 6) including a discharge part (e.g., an after-mentioned discharge part 71), a first introduction part (e.g., an after-mentioned first introduction tube 61), and a second introduction part (e.g., an after-mentioned second introduction tube 66), and discharges, through the discharge part, fluid introduced from the first and second introduction parts in a state where the main body is mounted to a mounting part. The main body is a cylindrical body formed with a pump flow path (e.g., an after-mentioned pump flow path 70) that extends along a flow direction (e.g., an after-mentioned axis O) of the fluid to be introduced from the first introduction part and that guides, to the discharge part, the fluid to be introduced from the first introduction part, a reduced part (e.g., an after-mentioned reduced part 73) with a diameter decreasing toward downstream is formed in the pump flow path on a side downstream of the first introduction part along the flow direction, in a state where the main body is mounted to the mounting part, a connection flow path (e.g., an after-mentioned connection flow path 78) that connects the second introduction part and the pump flow path is formed, and in a state where the main body is removed from the mounting part, the connection flow path communicates with outside.

(1) In an evaporated fuel treatment device according to the present invention, a purge pump includes a first introduction part connected to an intake passage on a side downstream of a supercharger, a second introduction part connected to a canister, and a discharge part. The purge pump is a cylindrical pump formed with a pump flow path that extends along a flow direction of fluid to be introduced from the first introduction part and that guides, to the discharge part, the fluid to be introduced from the first introduction part. Furthermore, a reduced part with a diameter decreasing from a first introduction part side toward a discharge part side is formed in this pump flow path. If the fluid is supplied from the first introduction part to such a purge pump and discharged through the discharge part, negative pressure is generated in the pump flow path by a Venturi effect (a negative pressure generation function).

Furthermore, in the present invention, in a state where the purge pump is mounted to a pump mounting part provided in the intake passage of an internal combustion engine on a side upstream of the supercharger, a connection flow path that connects the second introduction part and the pump flow path is formed. Consequently, in the state where the purge pump is mounted to the pump mounting part, intake air on a side downstream of the supercharger with a high pressure during supercharging flows into the first introduction part, flows through the pump flow path, and is discharged into the intake passage on the side upstream of the supercharger with a low pressure during the supercharging. Additionally, if the intake air flows through the pump flow path in this way, the above described negative pressure generation function causes a gas containing evaporated fuel to flow from the canister through the second introduction part and the connection flow path into the pump flow path, and the gas is discharged through the discharge part into the intake passage. That is, in the state where the purge pump is mounted to the pump mounting part, an evaporated fuel suction function of causing the gas containing evaporated fuel to flow from the second introduction part into the pump flow path is developed.

Furthermore, in the present invention, the connection flow path communicates with outside in a state where the purge pump is removed from the pump mounting part. Consequently, in a case where the purge pump is removed from the pump mounting part, the negative pressure generation function is maintained. However, the connection flow path communicates with the outside, and hence, this negative pressure does not cause any gas containing evaporated fuel to flow from a canister side to a second introduction part side. Therefore, according to the present invention, even in the case where the purge pump is removed from the pump mounting part, any evaporated fuel is not released to atmosphere. As described above, according to the present invention, in the case where the purge pump is removed from the pump mounting part, only the evaporated fuel suction function can be lost in the negative pressure generation function and the evaporated fuel suction function. Therefore, according to the present invention, quality of the negative pressure generation function can be inspected with the purge pump alone. Furthermore, in the case where the purge pump is removed from the pump mounting part, the evaporated fuel can be prevented from being released to the atmosphere.

(2) In the present invention, a through hole that communicates with the pump flow path is formed in the cylindrical purge pump closer to the first introduction part side than the reduced part, and in the state where the purge pump is mounted to the pump mounting part, a connection flow path is defined and formed as a space that connects a conduit line of the second introduction part and the pump flow path via the through hole. Consequently, the evaporated fuel treatment device can be simpler than in a case where the connection flow path that connects the second introduction part and the pump flow path is formed by a tube member.

(3) In the present invention, the purge pump comprises a cylindrical part formed with the pump flow path, and a flange part provided in this cylindrical part closer to the first introduction part side than the through hole, and the second introduction part is provided on a surface of the flange part on the first introduction part side. Furthermore, in the present invention, in the state where the purge pump is mounted to the pump mounting part, the pump mounting part is in close contact with an annular seal surface that is a surface of the flange part on the discharge part side and that surrounds the cylindrical part and the conduit line of the second introduction part. Consequently, the connection flow path that connects the second introduction part and the pump flow path can be defined and formed with a simple configuration.

(4) According to the present invention, for the same reason as in the invention according to the above (1), in a case where a main body of a fluid treatment device is removed from a mounting part, only a fluid suction function can be lost in the negative pressure generation function and the fluid suction function. Therefore, according to the present invention, the quality of the negative pressure generation function can be inspected with the main body of the fluid treatment device alone.

BRIEF DESCRIPTION OF THE DRAWINGS

FIG. 10 is a cross-sectional view of the pump body and the pump mounting part.

DETAILED DESCRIPTION OF THE INVENTION

Figure 1:
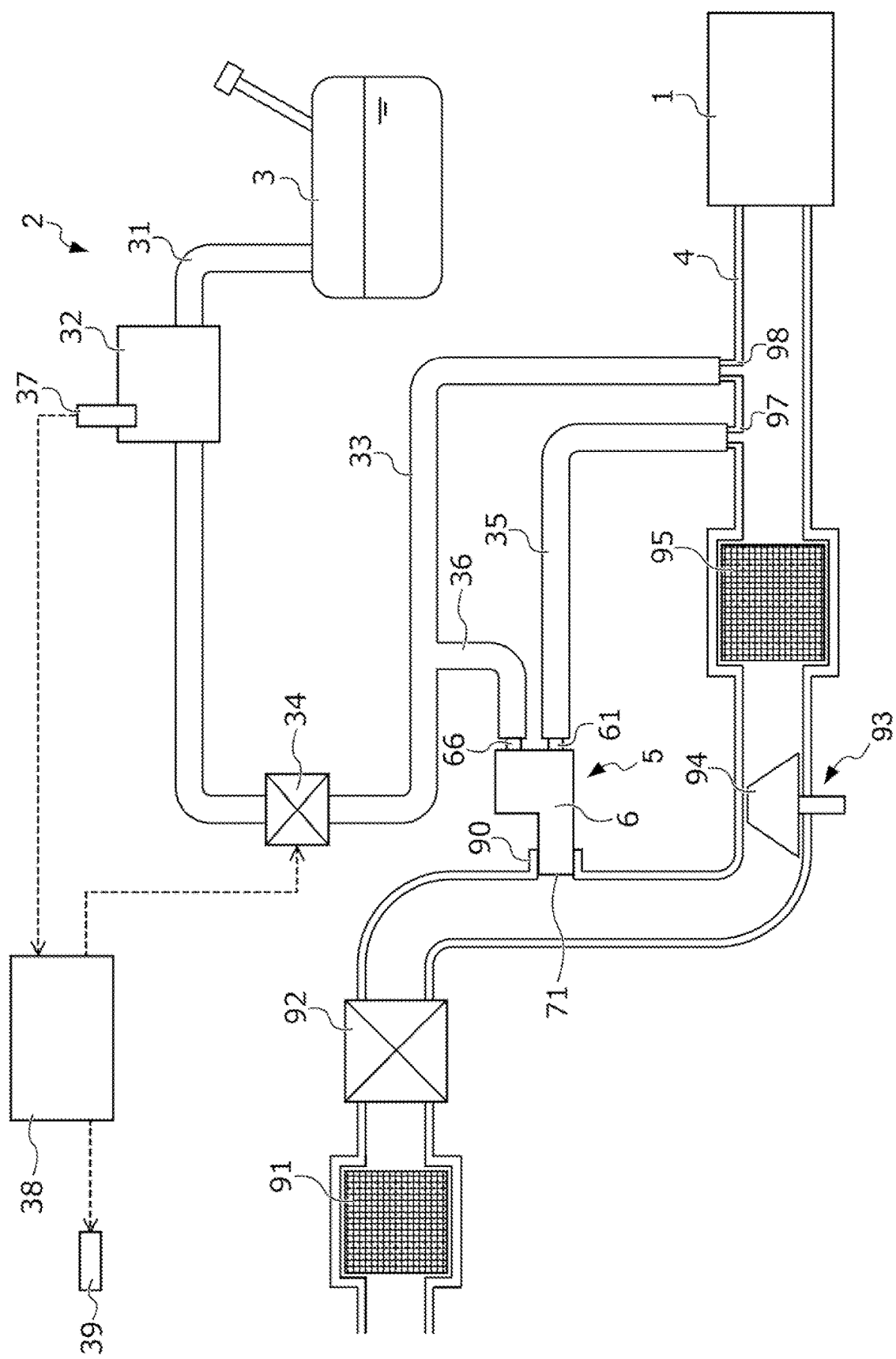
FIG. 1 is a view schematically showing a configuration including an evaporated fuel treatment device according to an embodiment of the present invention and an intake system of an engine to which this evaporated fuel treatment device is applied.

Hereinafter, an embodiment of the present invention will be described with reference to the drawings. FIG. 1 is a view schematically showing a configuration including an evaporated fuel treatment device 2 according to the present embodiment and an intake system of an internal combustion engine (hereinafter, referred to simply as "an engine") 1 to which this evaporated fuel treatment device 2 is applied.

In an intake pipe 4 that supplies air to unshown respective cylinders of the engine 1, an air cleaner 91 that removes foreign matter from air, an air flowmeter 92 that generates a signal in accordance with a flow rate of air to be introduced to each cylinder via the intake pipe 4, a compressor 94 of a supercharger 93 that compresses intake air by use of energy of exhaust of the engine 1 and an intercooler 95 that cools the intake air are provided in order from an upstream side toward a downstream side.

A pump mounting part 90 to which a pump body 6 of an after-mentioned purge pump 5 is mounted is provided in the intake pipe 4 on the side upstream of the compressor 94 and downstream of the air flowmeter 92. A reflux part 97 to which an after-mentioned bypass pipe 35 is mounted is provided in the intake pipe 4 on the side downstream of the compressor 94 and the intercooler 95. An introduction part 98 to which an after-mentioned first purge pipe 33 is mounted is provided in the intake pipe 4 on the side further downstream of the reflux part 97. The pump mounting part 90, reflux part 97 and introduction part 98 are each tubular. The pump mounting part 90, reflux part 97 and introduction part 98 are, for example, joined to the intake pipe 4 by welding, to be thereby formed integrally with the intake pipe 4.

The evaporated fuel treatment device 2 comprises a fuel tank 3 that stores fuel of the engine 1, a canister 32 connected to the fuel tank 3 via a charge pipe 31, the first purge pipe 33 that connects the canister 32 and the introduction part 98, a purge control valve 34 provided on the first purge pipe 33, the purge pump 5 that includes a discharge part 71, a first introduction tube 61, and a second introduction tube 66 and that discharges, through the discharge part 71, fluid to be introduced from the first introduction tube 61 and the second introduction tube 66, the bypass pipe 35 that connects the first introduction tube 61 and the reflux part 97, a second purge pipe 36 that branches from the first purge pipe 33 to reach the second introduction tube 66 of the purge pump 5, and an electronic control unit 38 (hereinafter, abbreviated as "the ECU 38").

The canister 32 comprises an unshown adsorbent material (specifically, e.g., activated carbon) that adsorbs evaporated fuel. The evaporated fuel generated in the fuel tank 3 is introduced into the canister 32 via the charge pipe 31, and is temporarily stored in the adsorbent material. The canister 32 is provided with a pressure sensor 37. The pressure sensor 37 transmits a detection signal to the ECU 38 in accordance with a pressure in the canister 32.

The canister 32 is connected to the introduction part 98 via the first purge pipe 33. The first purge pipe 33 is provided with the purge control valve 34. If the purge control valve 34 is opened, an interior of the canister 32 communicates with an interior of the intake pipe 4, and if the purge control valve 34 is closed, the interior of the canister 32 is shut off from the interior of the intake pipe 4. In a non-supercharging region where rotation of the compressor 94 of the supercharger 93 stops, negative pressure is generated in the intake pipe 4, and the pressure is lower than an atmospheric pressure. In the non-supercharging region, this negative pressure causes air to flow from the canister 32 to the intake pipe 4, and together with this flow, the evaporated fuel adsorbed on the adsorbent material in the canister 32 flows into the intake pipe 4 for use in combustion in the engine 1.

The second purge pipe 36 branches from the first purge pipe 33 closer to an introduction part 98 side than the purge control valve 34, to reach the second introduction tube 66 of the purge pump 5. If the purge control valve 34 is opened, the interior of the canister 32 communicates with the second introduction tube 66, and if the purge control valve 34 is closed, the interior of the canister 32 is shut off from the second introduction tube 66.

The bypass pipe 35 connects the reflux part 97 of the intake pipe 4 and the first introduction tube 61 of the purge pump 5. The pump body 6 of the purge pump 5 is also mounted to the pump mounting part 90 of the intake pipe 4. In a supercharging region where the compressor 94 of the supercharger 93 is driven to rotate, positive pressure is generated in the intake pipe 4 on the side downstream of the compressor 94, and the pressure is higher than the atmospheric pressure. Consequently, in the supercharging region, this positive pressure causes air to flow from the reflux part 97 to the first introduction tube 61.

The pump body 6 of the purge pump 5 is cylindrical as described later in detail with reference to FIG. 2 to FIG. 5 or the like, and a reduced part is provided in a pump flow path formed in the pump body. In a state where the pump body 6 is mounted to the pump mounting part 90, the first introduction tube 61 and the second introduction tube 66 communicate with the pump flow path in the pump body 6. Consequently, if air is introduced from the reflux part 97 to the first introduction tube 61 in the supercharging region, the negative pressure is generated in a process of air flow from the first introduction tube 61 through the pump flow path in the pump body 6. In the supercharging region, this negative pressure causes air to flow from the canister 32 to the second introduction tube 66, and together with this flow, the evaporated fuel adsorbed on the adsorbent material in the canister 32 is discharged from the pump body 6 into the intake pipe 4.

As described above, in the evaporated fuel treatment device 2, during non-supercharging, the evaporated fuel adsorbed in the canister 32 is supplied from the introduction part 98 into the intake pipe 4 via the first purge pipe 33 under the negative pressure generated in the intake pipe 4. Furthermore, during supercharging, the evaporated fuel adsorbed in the canister 32 is supplied from the pump mounting part 90 into the intake pipe 4 via the second purge pipe 36 and the purge pump 5, by the purge pump 5 operated by the positive pressure generated in the intake pipe 4 on the side downstream of the compressor 94.

The ECU 38 is a microcomputer constituted of an I/O interface that converts the detection signal of the sensor from analog to digital, a RAM or ROM that stores various types of data or various types of program, a CPU that executes each type of program, a drive circuit that drives the purge control valve 34 to open or close in a mode determined in this processing, and others. Here, examples of the program to be executed in the ECU 38 include a program to open and close the purge control valve 34 in purging the evaporated fuel adsorbed in the canister 32 along the above path, and a program to detect abnormality of the purge pump by use of the detection signal of the pressure sensor 37.

Figure 2:
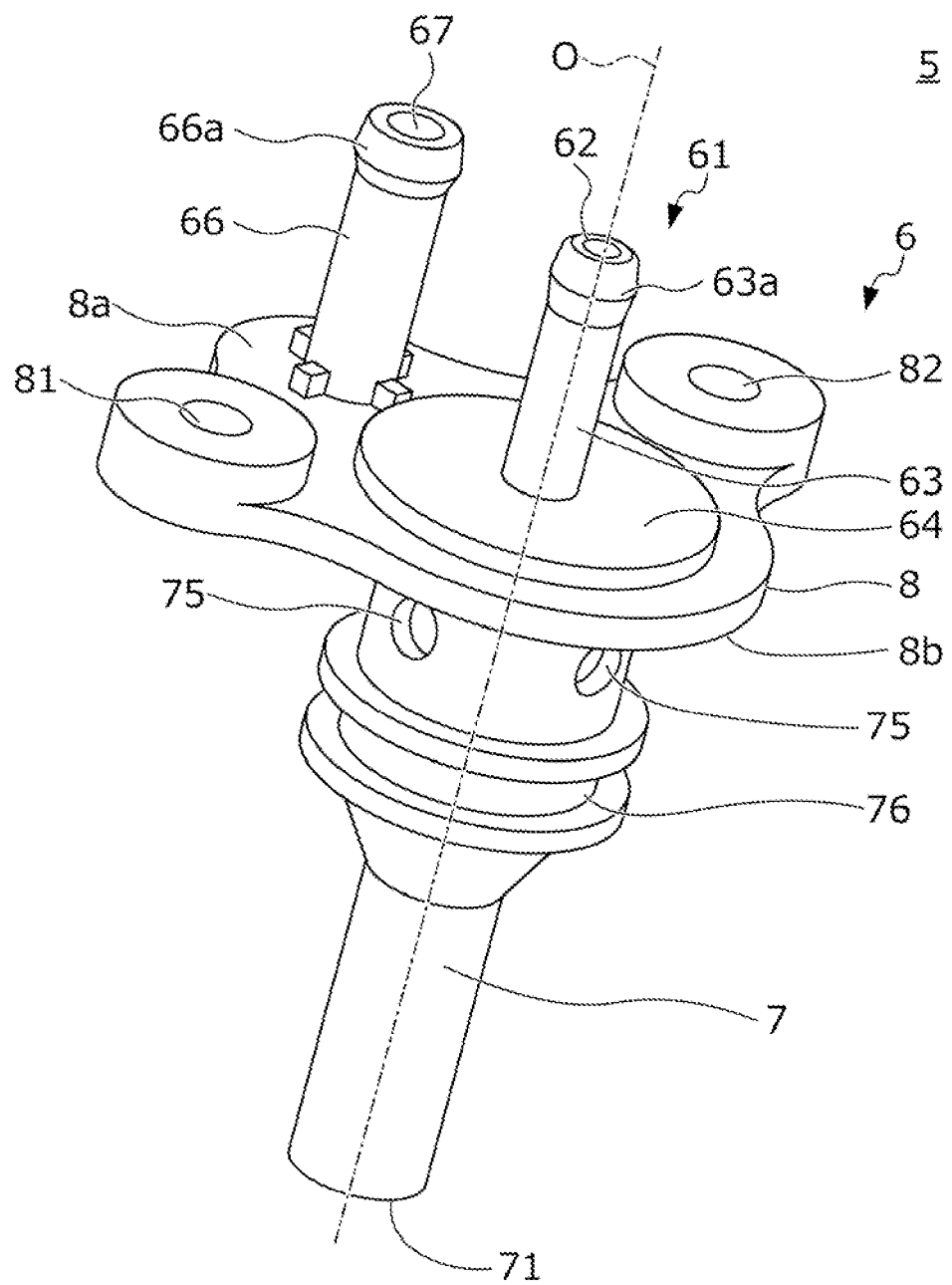
FIG. 2 is a perspective view of a purge pump.
Figure 3:
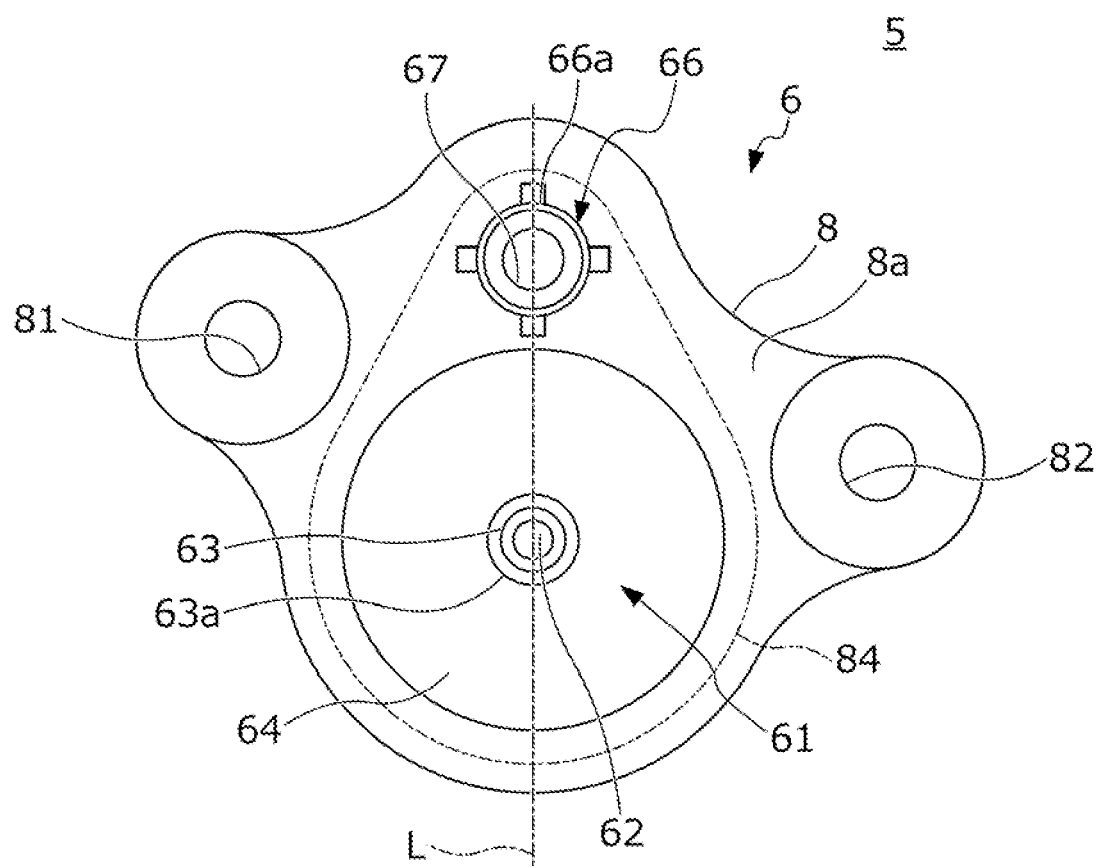
FIG. 3 is a front view of the purge pump seen from a first introduction tube side.
Figure 4:
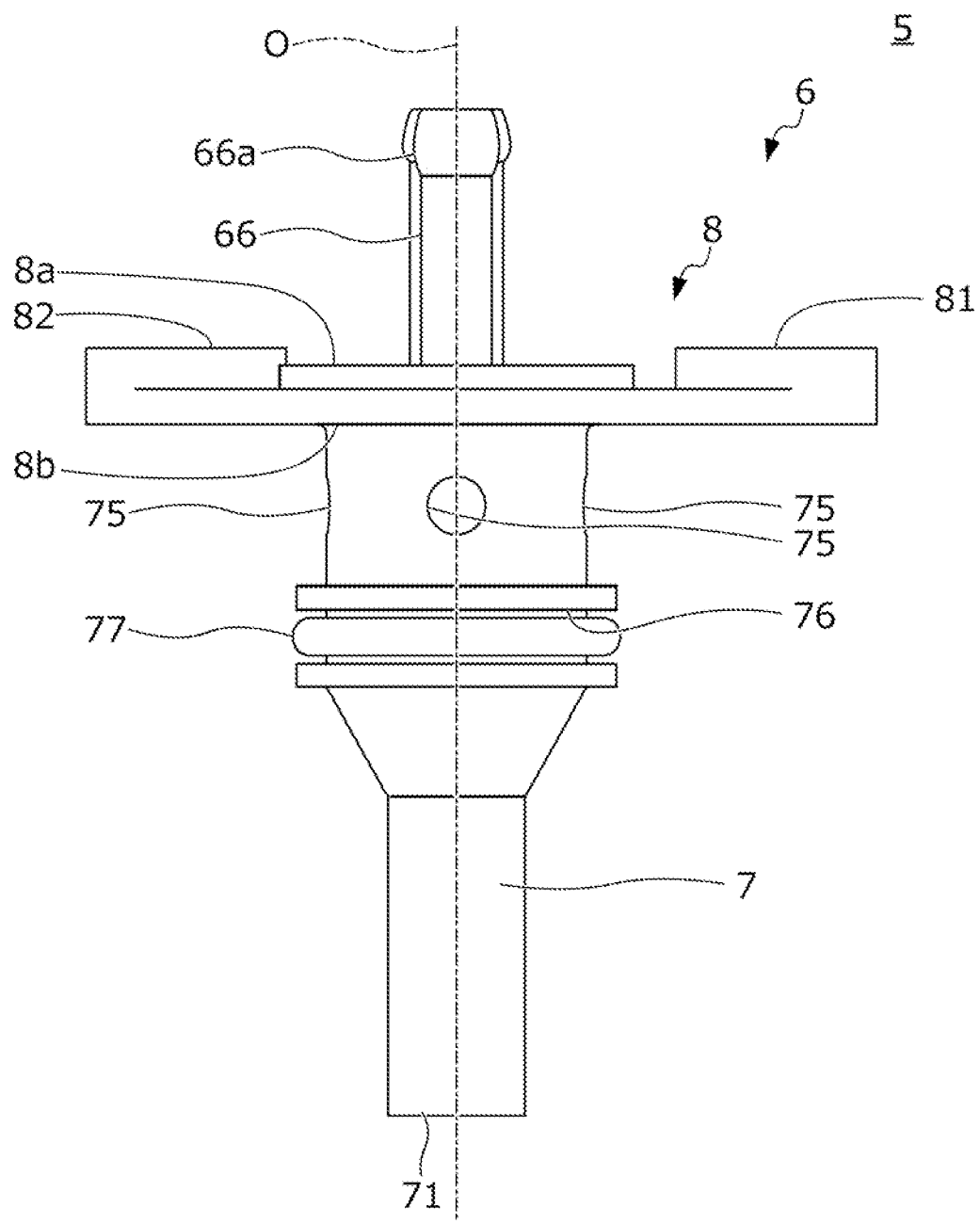
FIG. 4 is a plan view of the purge pump.

Next, description will be made as to a configuration of the purge pump 5 with reference to FIG. 2 to FIG. 5. FIG. 2 is a perspective view of the pump body 6 of the purge pump 5 seen from an introduction tube 61 and second introduction tube 66 side, FIG. 3 is a front view of the pump body 6 seen from the first introduction tube 61 and second introduction tube 66 side, FIG. 4 is a plan view of the pump body 6, and FIG. 5 is a cross-sectional view of the pump body 6.

The pump body 6 comprises a pump tube 7 that is a cylindrical tube member, a flange part 8 provided on one end side of the pump tube 7, the first introduction tube 61 that is a cylindrical tube member provided in the flange part 8, and the second introduction tube 66 that is a cylindrical tube member provided in the flange part 8.

Figure 5:
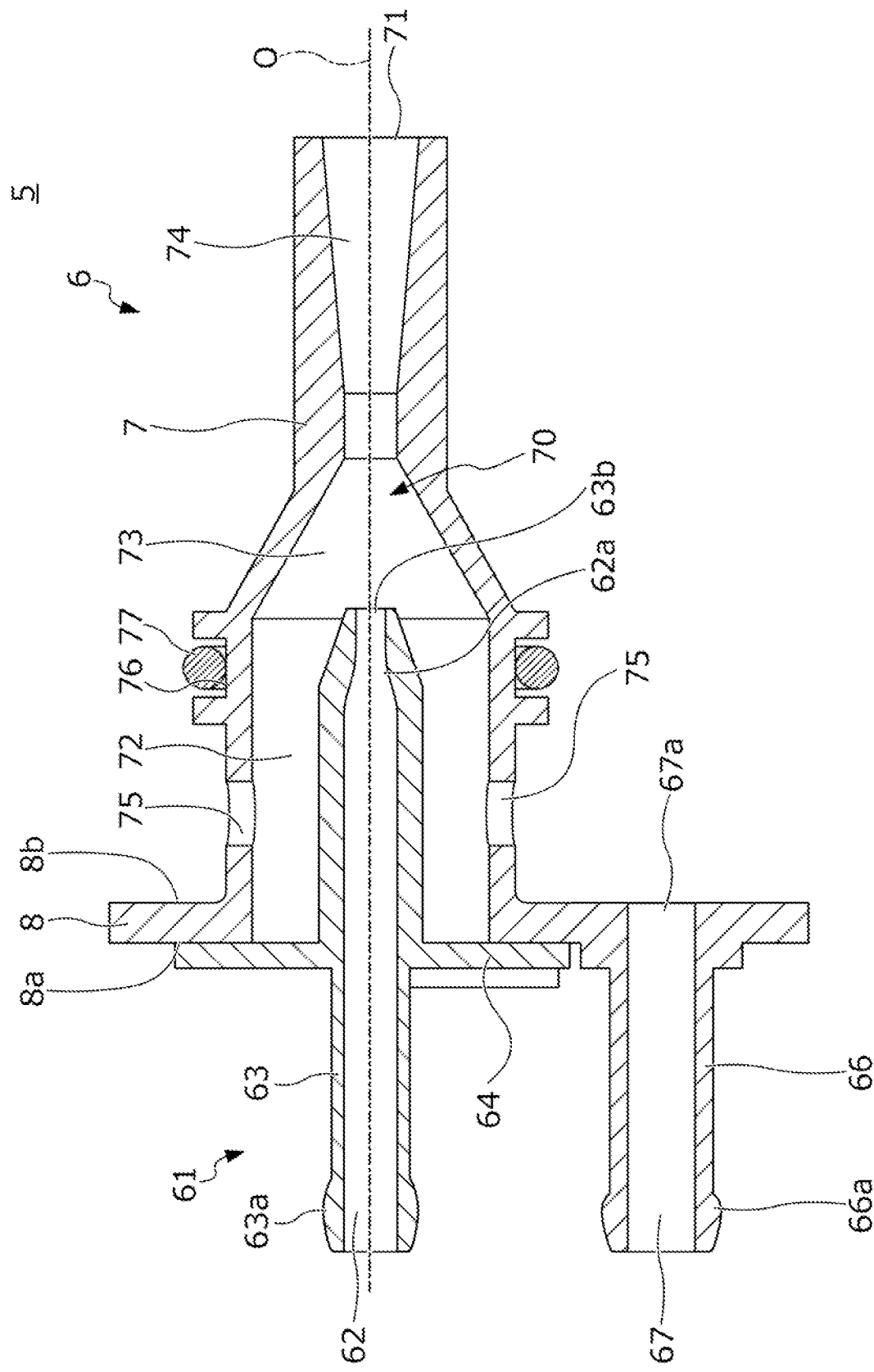
FIG. 5 is a cross-sectional view of the purge pump.

As shown in FIG. 5, in the pump tube 7, formed is a pump flow path 70 extending from a base side provided with the flange part 8 to a tip side along an axis O. The base side of the pump flow path 70 is sealed with the first introduction tube 61 provided in the flange part 8. Furthermore, the tip side of the pump flow path 70 is a discharge part 71 opposed to the interior of the intake pipe 4 in a state where the pump tube 7 is mounted to the pump mounting part 90.

In the pump flow path 70, a straight part 72, a reduced part 73 and an enlarged part 74 are formed in order from a flange part 8 side toward a discharge part 71 side. An inner diameter of the straight part 72 is almost constant along the axis O. On the other hand, an inner diameter of the reduced part 73 decreases from the flange part 8 side toward the discharge part 71 side along the axis O. Furthermore, an inner diameter of the enlarged part 74 increases from the flange part 8 side toward the discharge part 71 side along the axis O.

In an outer periphery of the pump tube 7, a plurality of through holes 75 and a groove portion 76 are formed in order from the flange part 8 side toward the discharge part 71 side. The plurality of through holes 75 are formed in the outer periphery of the pump tube 7 closer to the flange part 8 side than the reduced part 73. The straight part 72 of the pump flow path 70 communicates with an exterior of the pump tube 7 in the plurality of through holes 75. In the present embodiment, described is a case where four through holes 75 are formed at equal intervals in the outer periphery of the pump tube 7 along a circumferential direction of the pump tube 7, but a position where each through hole 75 is to be formed or a position of the through hole 75 is not limited to this case.

The groove portion 76 is an annular portion extending along the circumferential direction of the pump tube 7, and is recessed in cross-sectional view. The groove portion 76 is formed closer to the discharge part 71 side than the plurality of through holes 75. An annular first seal member 77 is fitted in the groove portion 76.

The flange part 8 is a plate part extending along an orientation that is orthogonal to the pump flow path 70. The flange part 8 is provided with the first introduction tube 61 and the second introduction tube 66.

The first introduction tube 61 comprises a tube body 63 that is a cylindrical tube member in which a straight first conduit line 62 is formed, and a flange part 64 provided on the tube body 63. A connecting portion 63a to which the bypass pipe 35 is connected is formed on a base side of the tube body 63, and a nozzle 63b opposed into the pump flow path 70 is formed on a tip side of the tube body 63. A reduced part 62a with a diameter decreasing from a connecting portion 63a side toward the nozzle 63b side is formed in the first conduit line 62 on a nozzle 63b side. The flange part 64 extends in an orientation that is orthogonal to the first conduit line 62. As shown in FIG. 3, the flange part 64 is disk shaped as seen along the first conduit line 62.

As shown in FIG. 5, the first introduction tube 61 is fixed to the flange part 8 by bringing a surface of the flange part 64 on the nozzle 63b side into contact closely with a surface 8a of the flange part 8 of the pump tube 7. Consequently, the base side of the pump flow path 70 is sealed with the flange part 64 of the first introduction tube 61. Furthermore, the first introduction tube 61 is fixed to the flange part 8 so that the first conduit line 62 is coaxial with the axis O of the pump flow path 70 and so that the nozzle 63b is closer to the discharge part 71 side than the through holes 75 along the axis O. As shown in FIG. 5, it is preferable that the nozzle 63b of the first introduction tube 61 is provided in a vicinity of a boundary between the straight part 72 and the reduced part 73 in the pump flow path 70. Therefore, air introduced from the connecting portion 63a side of the first introduction tube 61 to the first conduit line 62 is jetted out from the nozzle 63b along a flow direction that is coaxial with the axis O. Furthermore, air jetted out from the nozzle 63b is guided to the discharge part 71 along the axis O through the pump flow path 70.

The second introduction tube 66 is a cylindrical tube member in which a straight second conduit line 67 is formed. The second introduction tube 66 is provided on the surface 8a of the flange part 8 in parallel with the first conduit line 62 of the first introduction tube 61 and the axis O and orthogonally to the flange part 8. A connecting portion 66a to which the second purge pipe 36 is connected is formed on a base side of the second introduction tube 66, and the second introduction tube 66 is connected to the flange part 8 on a tip side of the tube. The second conduit line 67 of the second introduction tube 66 extends through the flange part 8 to a back surface 8b side. Furthermore, as shown in FIG. 2 and FIG. 5, the second introduction tube 66 is provided at a position apart by a predetermined distance from the first introduction tube 61 along a radial direction of the axis O in the flange part 8. Therefore, an introduction port 67a that is a portion of the second conduit line 67 on the back surface 8b side of the flange part 8 is outside the through holes 75 along the radial direction of the axis O.

A first bolt insertion hole 81 and a second bolt insertion hole 82 are formed as through holes extending through an outer periphery of the flange part 8 from the surface 8a to the back surface 8b. As shown in FIG. 3, these bolt insertion holes 81, 82 are formed in the outer periphery of the flange part 8 to sandwich a virtual line L interposed between the first introduction tube 61 and the second introduction tube 66 and passing through the first introduction tube 61 and the second introduction tube 66.

In the purge pump 5 described above, air introduced from the bypass pipe 35 to the first introduction tube 61 is jetted out from the nozzle 63*b* of the first introduction tube 61 into the pump flow path 70 along the flow direction coaxial with the axis O, and the air is discharged from the discharge part 71 through the reduced part 73 and the enlarged part 74. In this case, the air jetted out from the nozzle 63*b* passes through the reduced part 73 and is accelerated while a cross-sectional area of a flow path of the part is reduced, and hence, the negative pressure is generated in the pump flow path 70 by a Venturi effect. Furthermore, because of this negative pressure, the air outside the pump tube 7 is drawn into the pump flow path 70 via the plurality of through holes 75. Hereinafter, such a function of the purge pump 5 will be referred to also as a negative pressure generation function. As described above, the purge pump 5 exerts the negative pressure generation function even in a state where the pump mounting part 90 described later is not attached.

Figure 6:
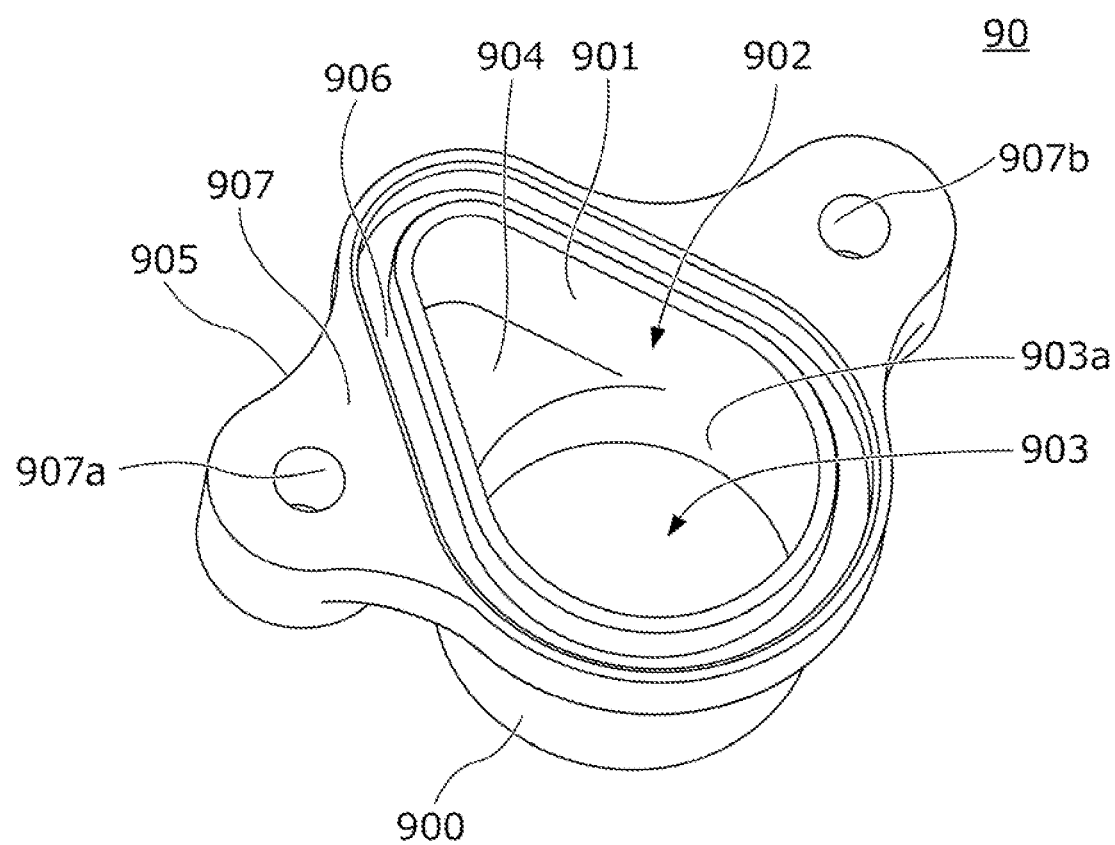
FIG. 6 is a perspective view of a pump mounting part seen from a purge pump side.
Figure 7:
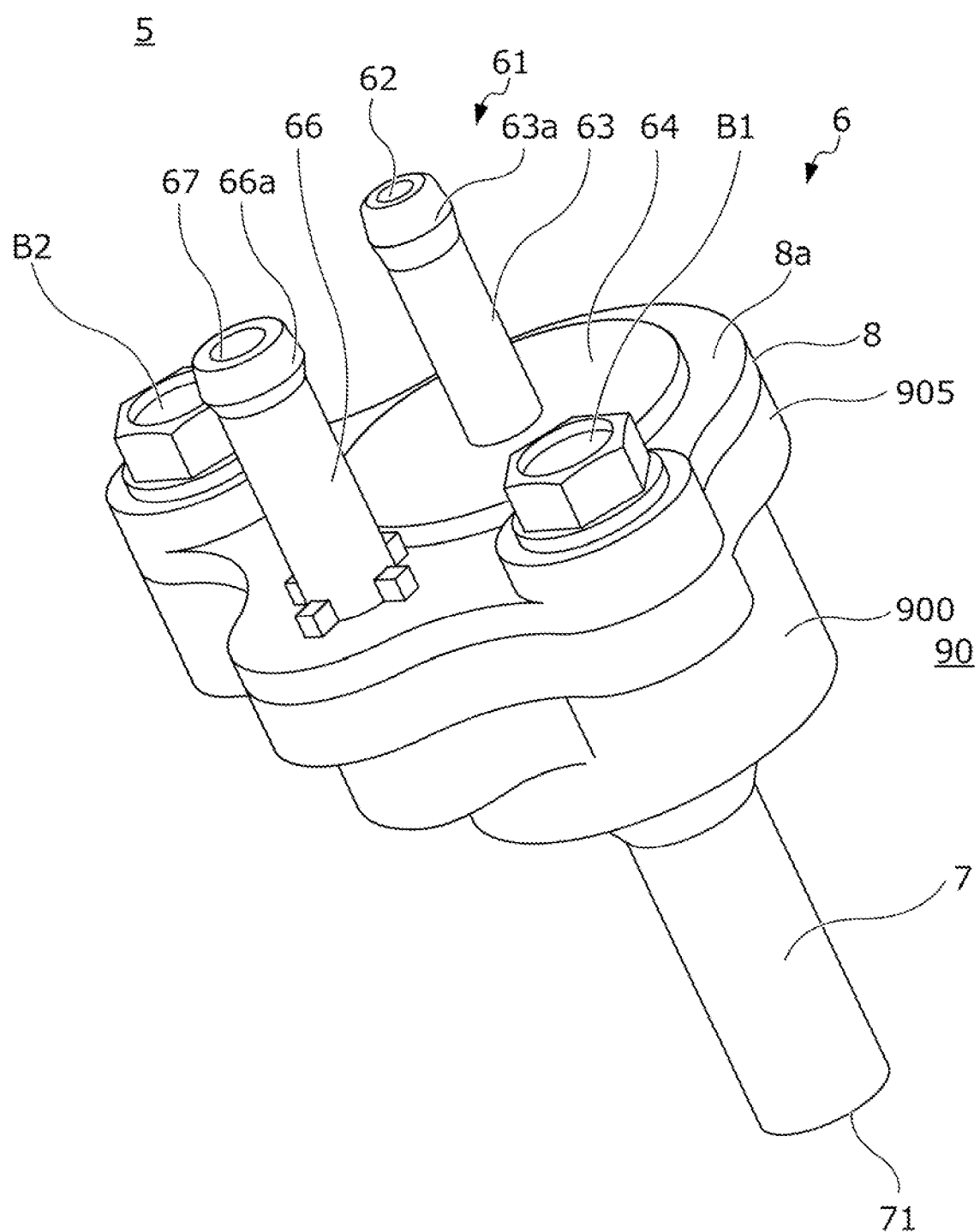
FIG. 7 is a perspective view of a pump body and the pump mounting part.
Figure 8:
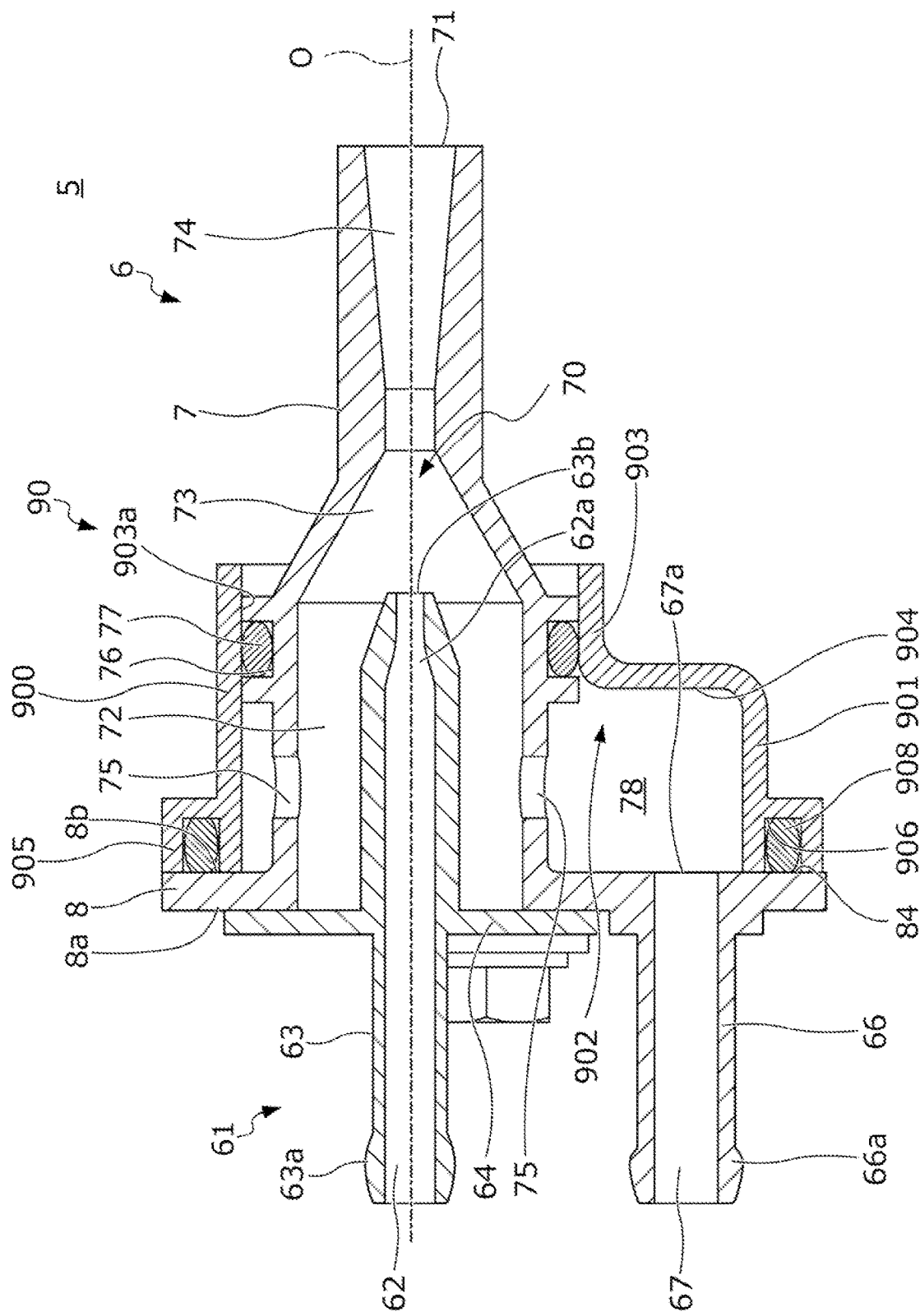
FIG. 8 is a cross-sectional view of the pump body and the pump mounting part.
Figure 9:
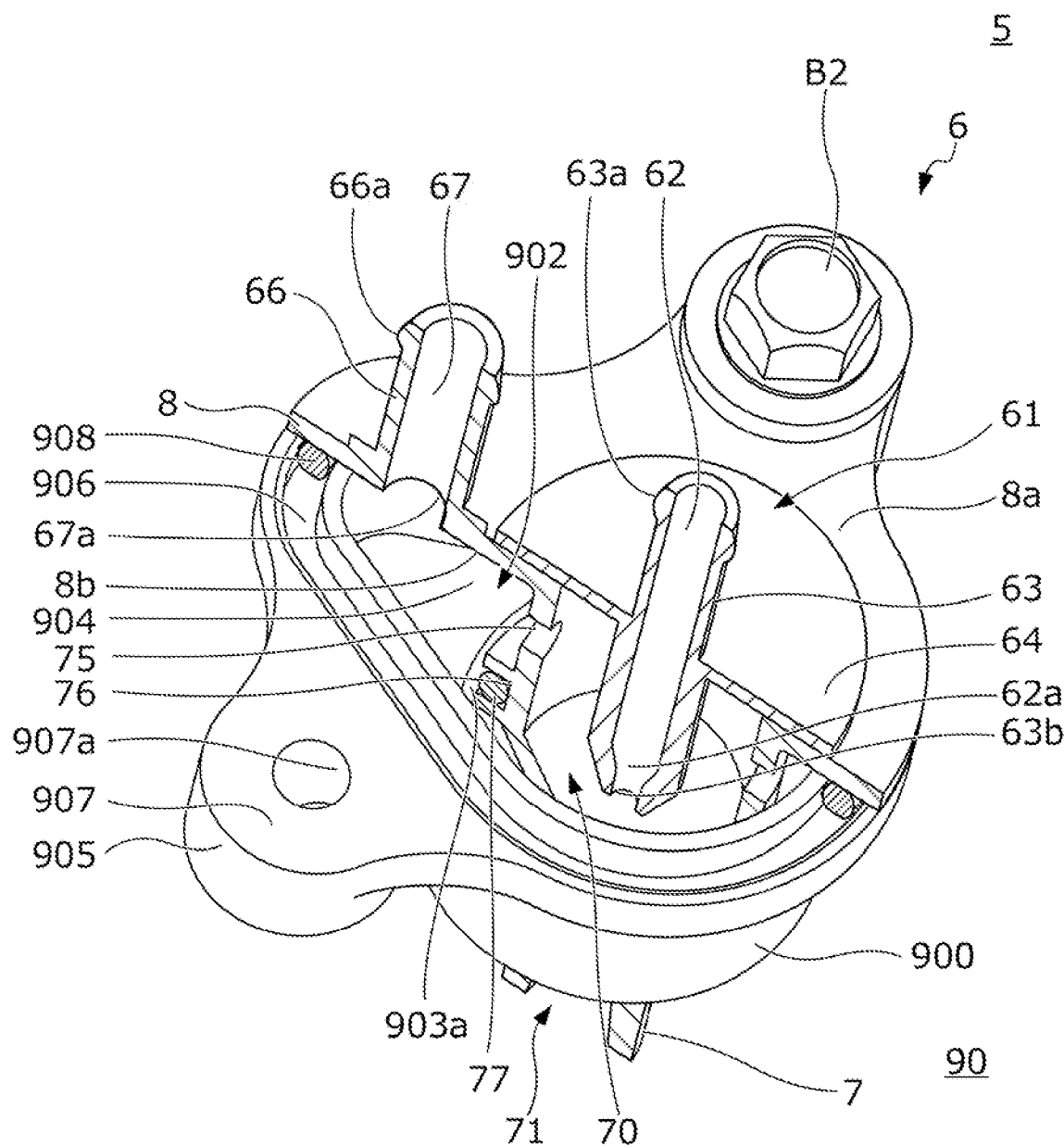
FIG. 9 is a partially broken perspective view of the pump body and the pump mounting part.

FIG. 6 is a perspective view of the pump mounting part 90 seen from a purge pump 5 side, FIG. 7 is a perspective view of the pump body 6 and the pump mounting part 90, FIG. 8 is a cross-sectional view of the pump body 6 and the pump mounting part 90, and FIG. 9 is a partially broken perspective view of the pump body 6 and the pump mounting part 90. Note that FIG. 7 to FIG. 9 show the state where the pump body 6 is mounted to the pump mounting part 90.

As shown in FIG. 6, the pump mounting part 90 comprises a receiving portion 900 that is recessed as seen from a pump body 6 side, and a flange part 905 provided at an edge of the receiving portion 900 on the pump body 6 side. As shown in FIG. 7 and FIG. 8, the pump mounting part 90 covers the back surface 8*b* of the flange part 8 and a part of the pump tube 7 in the pump body 6 in the state where this pump mounting part is attached to the pump body 6.

The receiving portion 900 comprises a side wall portion 901 extending along the axis O, and a bottom portion 902 that is orthogonal to the axis O.

As shown in FIG. 8, a length of the side wall portion 901 along the axis O is larger than a length of the pump tube 7 from the back surface 8*b* of the flange part 8 to the plurality of through holes 75 along the axis O. Consequently, the side wall portion 901 faces the plurality of through holes 75 along the radial direction of the axis O, in the state where the pump body 6 is mounted to the pump mounting part 90.

In the bottom portion 902, formed are a pump tube insertion hole 903 that is a through hole into which the pump tube 7 is inserted, and a bottom surface 904 that faces the introduction port 67*a* formed in the back surface 8*b* of the flange part 8, in the state where the pump body 6 is mounted to the pump mounting part 90 as shown in FIG. 8.

The pump tube insertion hole 903 comprises an inner wall surface 903*a* extending along the axis O. An inner diameter of the inner wall surface 903*a* is slightly larger than an outer diameter of the groove portion 76 of the pump tube 7 and is smaller than an outer diameter of the first seal member 77. Consequently, when the pump tube 7 is inserted into the pump tube insertion hole 903, the first seal member 77 provided in the groove portion 76 is elastically deformed, and an outer peripheral surface of the first seal member 77 abuts closely on the inner wall surface 903*a* in an entire circumference. Thus, a space between the pump tube 7 and the pump tube insertion hole 903 is sealed in the state where the pump body 6 is mounted to the pump mounting part 90.

The bottom surface 904 extends from the pump tube insertion hole 903 to an introduction port 67*a* side in a plane that is orthogonal to the axis O. In the state where the pump body 6 is mounted to the pump mounting part 90, the bottom surface 904 faces the introduction port 67*a* along the axis O.

The flange part 905 extends outward in the radial direction along an orientation that is orthogonal to the axis O. In a surface of the flange part 905 on the pump body 6 side, a seal mounting groove 906 and a mounting surface 907 are formed in order from an axis O side to outside in the radial direction.

The mounting surface 907 is almost flat. As shown in FIG. 7 to FIG. 9, the mounting surface 907 abuts on the back surface 8*b* of the flange part 8 in the pump body 6 in the state where the pump body 6 is mounted to the pump mounting part 90. Furthermore, in the mounting surface 907, two bolt insertion holes 907*a*, 907*b* that are coaxial with two bolt insertion holes 81, 82 provided in the flange part 8 are formed in the state where the pump body 6 is mounted to the pump mounting part 90. Therefore, in a state where the bolt insertion holes 81, 82 of the pump body 6 are coaxial with the bolt insertion holes 907*a*, 907*b* of the pump mounting part 90, the pump body 6 is mounted to the pump mounting part 90 by inserting and fastening each of bolts B1, B2 into these insertion holes.

The seal mounting groove 906 is annular as seen from the pump body 6 side along the axis O, and is recessed in cross-sectional view. A bottom surface of the seal mounting groove 906 is lower than the mounting surface 907. That is, the bottom surface of the seal mounting groove 906 is closer to a bottom portion 902 side than the mounting surface 907 along the axis O. An annular second seal member 908 is fitted into the seal mounting groove 906. A surface of the second seal member 908 on the pump body 6 side is higher than the mounting surface 907 in a state where the second seal member 908 is fitted into the seal mounting groove 906.

Furthermore, the seal mounting groove 906 and the second seal member 908 that are annular are on an inner side of the two bolt insertion holes 907*a*, 907*b*, and surround the bottom surface 904 and the pump tube insertion hole 903, as seen from the pump body 6 side along the axis O. Consequently, in the state where the pump body 6 is mounted to the pump mounting part 90, the second seal member 908 provided in the seal mounting groove 906 is elastically deformed, to abut closely on the annular seal surface 84 that is a linear surface surrounding the pump tube 7 and the introduction port 67*a* of the second introduction tube 66 in the back surface 8*b* of the flange part 8 (see a broken line in FIG. 3). Thus, in the state where the pump body 6 is mounted to the pump mounting part 90, a space between the back surface 8*b* of the flange part 8 of the pump body 6 and the flange part 905 of the pump mounting part 90 is sealed.

As described above, in the state where the pump body 6 is mounted to the pump mounting part 90, a space between the pump tube 7 of the pump body 6 and the pump tube insertion hole 903 of the pump mounting part 90 and a space between the flange part 8 of the pump body and the flange part 905 of the pump mounting part are sealed with the first seal member 77 and the second seal member 908, respectively. Furthermore, in the state where the pump body 6 is mounted to the pump mounting part 90, the plurality of through holes 75 formed in the pump tube 7 face the side wall portion 901 along the radial direction of the axis O, and the introduction port 67*a* formed in the back surface 8*b* of the flange part 8 faces the bottom surface 904 along the axis O. Consequently, as shown in FIG. 8, in the state where the pump body 6 is mounted to the pump mounting part 90, a connection flow path 78 is defined and formed as a space that connects the pump flow path 70 and the second conduit line 67 of the second introduction tube 66 via the plurality of through holes 75.

Therefore, if the negative pressure generation function is exerted by the purge pump 5 as described above by introducing air from the bypass pipe 35 into the first introduction tube 61 in the state where the pump body 6 is mounted to the pump mounting part 90, air flows from the second conduit line 67 of the second introduction tube 66 through the connection flow path 78 and the through holes 75 to the pump flow path 70. Consequently, the evaporated fuel stored in the adsorbent material of the canister 32 is suctioned through the second conduit line 67 of the second introduction tube 66, the connection flow path 78 and the through holes 75 into the pump flow path 70 via the second purge pipe 36 connected to the second introduction tube 66, and together with air jetted out from the first introduction tube 61, the fuel is discharged through the discharge part 71 into the intake pipe 4. Hereinafter, such a function as described above that is exerted in the state where the pump body 6 is mounted to the pump mounting part 90 will be referred to as an evaporated fuel suction function. In the state where the pump body 6 is mounted to the pump mounting part 90 as described above, the purge pump 5 exerts both the negative pressure generation function and the evaporated fuel suction function.

FIG. 10 is a cross-sectional view of the pump body 6 and the pump mounting part 90. More specifically, FIG. 10 shows a state where the pump body 6 is removed from the pump mounting part 90.

If the pump body 6 is removed from the pump mounting part 90 as shown in FIG. 10, a gap is formed between the second seal member 908 provided in the pump mounting part 90 and the seal surface 84 on the back surface 8*b* of the flange part 8, and a gap is further formed between the first seal member 77 provided in the pump tube 7 and the inner wall surface 903*a* in the pump mounting part 90. Consequently, in the state where the pump body 6 is removed from the pump mounting part 90, the connection flow path 78 that connects the introduction port 67*a* and the through holes 75 communicates with outside of the pump body 6 and the pump mounting part 90. Consequently, in the state where the pump body 6 is removed from the pump mounting part 90, only the evaporated fuel suction function is lost in the negative pressure generation function and the evaporated fuel suction function. Therefore, according to the purge pump 5 of the present embodiment, in a case where the pump body 6 is removed from the pump mounting part 90 for some reason, the evaporated fuel suction function is lost, and hence, the evaporated fuel is not released to atmosphere.

According to the evaporated fuel treatment device 2 of the present embodiment, the following effects are produced. (1) The pump body 6 of the purge pump 5 includes the first introduction tube 61 connected to the intake pipe 4 on the side downstream of the supercharger 93, the second introduction tube 66 connected to the canister 32, and the discharge part 71. The pump body 6 is a cylindrical body formed with the pump flow path 70 that extends along the axis O and that guides, to the discharge part 71, air to be introduced from the first introduction tube 61. Furthermore, the reduced part 73 with the diameter decreasing from the first introduction tube 61 side toward the discharge part 71 side is formed in this pump flow path 70. If air is supplied from the first introduction tube 61 to this purge pump 5 and discharged through the discharge part 71, the negative pressure is generated in the pump flow path 70 by the Venturi effect.

Furthermore, in the state where the pump body 6 is mounted to the pump mounting part 90 provided in the intake pipe 4 of the engine 1 on the side upstream of the supercharger 93, the connection flow path 78 that connects the second introduction tube 66 and the pump flow path 70 is formed. Consequently, in the state where the pump body 6 is mounted to the pump mounting part 90, air on the side downstream of the supercharger with a high pressure during supercharging flows into the first introduction tube 61, flows through the pump flow path 70, and is discharged into the intake pipe 4 on the side upstream of the supercharger with a low pressure during the supercharging. Additionally, if air flows through the pump flow path 70 in this way, the negative pressure generation function causes the gas containing evaporated fuel to flow from the canister 32 through the second introduction tube 66 and the connection flow path 78 into the pump flow path 70, and the gas is discharged through the discharge part 71 into the intake pipe 4. That is, in the state where the pump body 6 is mounted to the pump mounting part 90, the evaporated fuel suction function of causing the gas containing evaporated fuel to flow from the second introduction tube 66 into the pump flow path 70 is developed.

Furthermore, the connection flow path 78 communicates with the outside in the state where the pump body 6 is removed from the pump mounting part 90. Consequently, in the case where the pump body 6 is removed from the pump mounting part 90, the negative pressure generation function is maintained. However, the connection flow path 78 communicates with the outside, and hence, this negative pressure does not cause any gas containing evaporated fuel to flow from a canister 32 side to the second introduction tube 66 side. Therefore, according to the evaporated fuel treatment device 2 of the present embodiment, even in the case where the pump body 6 is removed from the pump mounting part 90, any evaporated fuel is not released to the atmosphere. As described above, according to the evaporated fuel treatment device 2, in the case where the pump body 6 is removed from the pump mounting part 90, only the evaporated fuel suction function can be lost in the negative pressure generation function and the evaporated fuel suction function. Therefore, according to the evaporated fuel treatment device 2, quality of the negative pressure generation function can be inspected with the purge pump 5 alone. Furthermore, in a case where the purge pump 5 is removed from the pump mounting part 90, the evaporated fuel can be prevented from being released to the atmosphere.

(2) In the evaporated fuel treatment device 2, the through hole 75 that communicates with the pump flow path 70 is formed in the cylindrical pump tube 7 closer to the first introduction tube 61 side than the reduced part 73, and in the state where the pump body 6 is mounted to the pump mounting part 90, the connection flow path 78 is defined and formed as the space that connects the second conduit line 67 of the second introduction tube 66 and the pump flow path 70 via the through hole 75. Consequently, the evaporated fuel treatment device 2 can be simpler than in a case where the connection flow path 78 that connects the second introduction tube 66 and the pump flow path 70 is formed by a tube member.

(3) In the evaporated fuel treatment device 2, the pump body 6 comprises the pump tube 7 formed with the pump flow path 70, and the flange part 8 provided in the pump tube 7 closer to the first introduction tube 61 side than the through hole 75, and the second introduction tube 66 is provided on the surface 8a of the flange part 8. Furthermore, in the evaporated fuel treatment device 2, in the state where the pump body 6 is mounted to the pump mounting part 90, the pump mounting part 90 is in close contact with the annular seal surface 84 that is the back surface 8b of the flange part 8 and that surrounds the pump tube 7 and the second conduit line 67 of the second introduction tube 66. Consequently, the connection flow path 78 that connects the second introduction tube 66 and the pump flow path 70 can be defined and formed with a simple configuration.

One embodiment of the present invention has been described above, but the present invention is not limited to this embodiment. Configurations of details may be suitably changed in gist of the present invention.

For example, in the above embodiment, description has been made as to a case where the purge pump 5 is applied to the evaporated fuel treatment device 2, but the present invention is not limited to this case. The purge pump 5 may be used as a fluid treatment device that discharges, through the discharge part 71, some fluid introduced from the first introduction tube 61 and the second introduction tube 66.

What is claimed is:

1. An evaporated fuel treatment device comprising:
   a pump mounting part provided in an intake passage of an internal combustion engine on a side upstream of a supercharger;
   a purge pump including a discharge part, a first introduction part, and a second introduction part;
   a bypass passage that communicates between the intake passage on a side downstream of the supercharger and the first introduction part; and
   a purge passage that communicates between a canister containing an adsorbent material that adsorbs evaporated fuel and the second introduction part,
   wherein in a state where the purge pump is mounted to the pump mounting part, fluid introduced from the first and second introduction parts is discharged through the discharge part into the intake passage,
   the purge pump is a cylindrical pump formed with a pump flow path that extends along a flow direction of the fluid to be introduced from the first introduction part and that guides, to the discharge part, the fluid to be introduced from the first introduction part,
   a reduced part with a diameter decreasing toward downstream is formed in the pump flow path on the side downstream of the first introduction part along the flow direction,
   in a state where the purge pump is mounted to the pump mounting part, a connection flow path that connects the second introduction part and the pump flow path is formed, and
   in a state where the purge pump is removed from the pump mounting part, the connection flow path communicates with atmosphere.

2. The evaporated fuel treatment device according to claim 1, wherein a through hole that communicates with the pump flow path is formed in the purge pump closer to a side of the first introduction part than the reduced part,
   the second introduction part is a tubular part in which a conduit Fine is formed, and
   in the state where the purge pump is mounted to the pump mounting part, the connection flow path is defined and formed as a space that connects the conduit line and the pump flow path via the through hole.

3. The evaporated fuel treatment device according to claim 2, wherein the purge pump comprises a cylindrical part having an interior formed with the pump flow path and an outer periphery formed with the through hole, and a flange part provided in the cylindrical part closer to a side of the first introduction part than the through hole and extending in an orientation that is orthogonal to the pump flow path,
   the second introduction part is provided on a surface of the flange part on the first introduction part side,
   the conduit line extends through the flange part, and
   in the state where the purge pump is mounted to the pump mounting part, the pump mounting part is in close contact with an annular seal surface that is a surface of the flange part on a side of the discharge part and that surrounds the cylindrical part and the conduit line.

4. A fluid treatment device comprising a main body including a discharge part, a first introduction part, and a second introduction part, and being configured to discharge, through the discharge part, fluid introduced from the first and second introduction parts in a state where the main body is mounted to a mounting part,
   wherein the main body is a cylindrical body formed with a pump flow path that extends along a flow direction of the fluid to be introduced from the first introduction part and that guides, to the discharge part, the fluid to be introduced from the first introduction part,
   a reduced part with a diameter decreasing toward downstream is formed in the pump flow path on a side downstream of the first introduction part along the flow direction,
   in a state where the main body is mounted to the mounting part, a connection flow path that connects the second introduction part and the pump flow path is formed between an inner wall surface of the mounting part and an outer wall surface of the main body, and
   in a state where the main body is removed from the mounting part, the connection flow path communicates with atmosphere.

* * * * *